United States Patent
Lenzen

(10) Patent No.: US 6,755,066 B2
(45) Date of Patent: Jun. 29, 2004

(54) BENDING DEVICE FOR BENDING PLASTICALLY DEFORMABLE STRIP MATERIAL

(75) Inventor: Oliver Lenzen, Sachsemheim (DE)

(73) Assignee: Valeo Wischersysteme GmbH (DE)

( * ) Notice: Subject to any disclaimer, the term of this patent is extended or adjusted under 35 U.S.C. 154(b) by 0 days.

(21) Appl. No.: 10/203,999

(22) PCT Filed: Feb. 22, 2001

(86) PCT No.: PCT/EP01/02011
§ 371 (c)(1),
(2), (4) Date: Aug. 15, 2002

(87) PCT Pub. No.: WO01/62408
PCT Pub. Date: Aug. 30, 2001

(65) Prior Publication Data
US 2003/0012841 A1 Jan. 16, 2003

(30) Foreign Application Priority Data
Feb. 24, 2000  (DE) ........................................ 100 08 714

(51) Int. Cl.⁷ ................................................ B21D 5/14
(52) U.S. Cl. .............................. 72/175; 72/171; 72/161
(58) Field of Search ........................... 72/171, 168, 161, 72/173, 175

(56) References Cited

U.S. PATENT DOCUMENTS

| | | | | |
|---|---|---|---|---|
| 928,073 A | * | 7/1909 | Schneider ..................... | 72/171 |
| 1,942,992 A | * | 1/1934 | Yates ........................... | 72/171 |
| 2,160,216 A | * | 5/1939 | Kane ............................ | 72/171 |
| 2,410,298 A | * | 10/1946 | Mirel ........................... | 72/171 |
| 2,503,597 A | * | 4/1950 | Rodder ........................ | 72/171 |
| 3,520,166 A | * | 7/1970 | Steele .......................... | 72/175 |
| 3,676,910 A | * | 7/1972 | Gross ........................... | 72/170 |
| 4,335,758 A | * | 6/1982 | Williams ...................... | 72/161 |
| 4,549,422 A | * | 10/1985 | Harrow ........................ | 72/171 |

FOREIGN PATENT DOCUMENTS

| | | |
|---|---|---|
| DE | 44 16 258 | 11/1995 |
| DE | 198 16 609 | 10/1999 |
| NL | 7 807040 | 10/1980 |

\* cited by examiner

Primary Examiner—Daniel C. Crane
(74) Attorney, Agent, or Firm—J. Gordon Lewis

(57) ABSTRACT

A bending device for bending plastically deformable strip material. The reverse bending that is required for workpieces with narrow processing tolerances in particular takes place independently of the actual bending. This increases the processing precision of the workpieces and simplifies the numerical control of the device. The reverse bending unit is moveably arranged on the bending unit in the bending device.

20 Claims, 1 Drawing Sheet

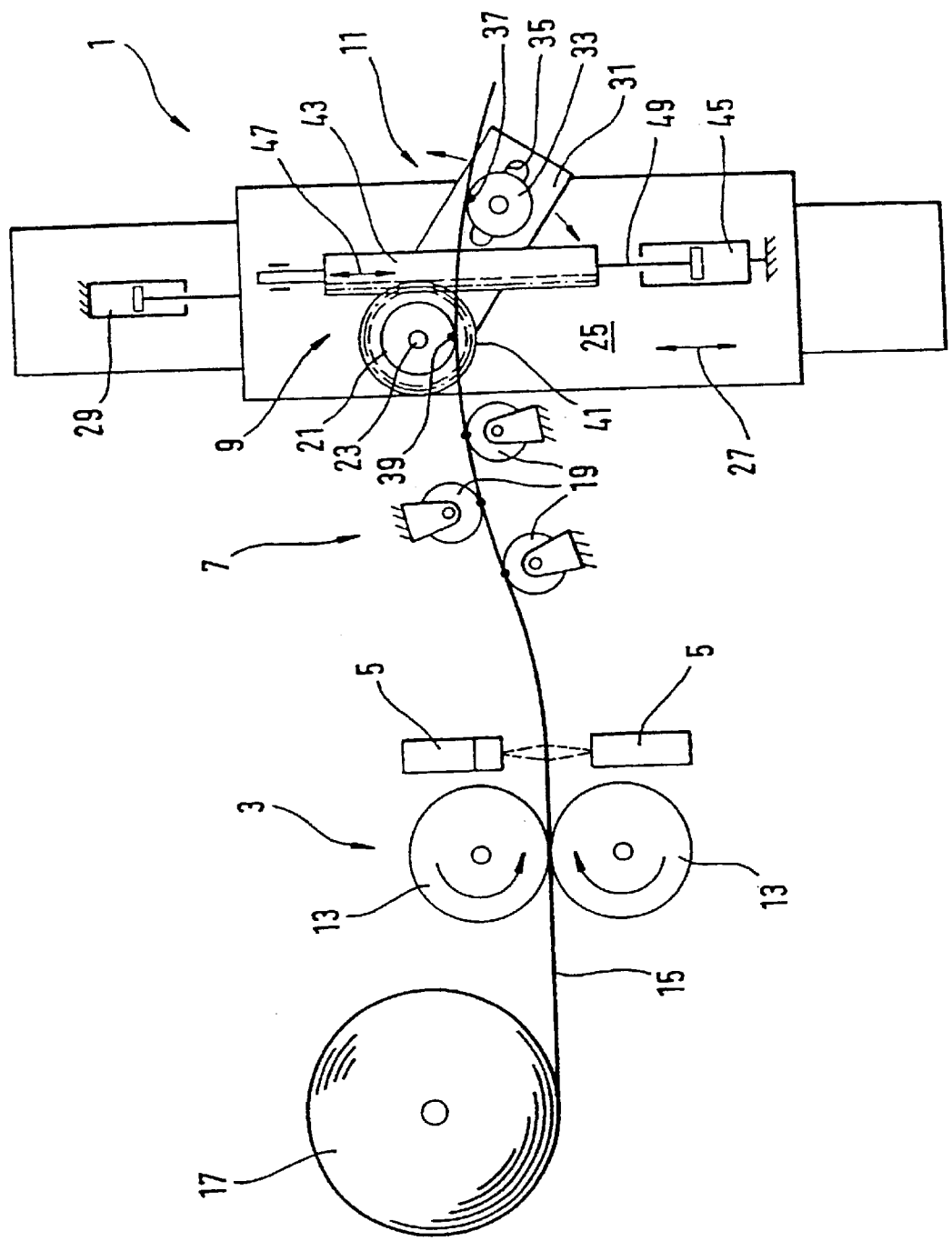

BENDING DEVICE FOR BENDING PLASTICALLY DEFORMABLE STRIP MATERIAL

BACKGROUND

The invention relates to a bending device for bending plastically deformable strip material, having an advance unit, a guide unit and a bending unit, where the bending unit has a bending roller and a reverse bending unit.

This bending unit is known from DE-OS 198 16 609 A1. It is used for bending sections of strip material which can be used to produce flat-blade windshield wipers. The bending unit of this known bending device consists essentially of several locating points through which the strip material to be bent is guided. Depending on the desired bending radius, the relative position of the locating points to each other is changed. In order to obtain high-precision bent parts, it is necessary to reduce the residual stress created in the strip material during bending by controlled reverse bending and thus ensure the formal accuracy of the work piece during operation. The reverse bending unit of the known bending unit consists essentially of a bending roller whose relative position to the bending unit can be altered, so that reverse bending can be adjusted to the desired degree.

The disadvantage of this bending device is that the position of the reverse bending unit depends both on the position of the bending unit as well as on the desired degree of reverse bending. The consequence of the dependence of the position of the reverse bending unit on the bending unit is that, even with constant reverse bending but changing initial bending, the reverse bending unit has to be controlled to match the change in the bend. If both bending and reverse bending are to be changed during the bending process, both the above dependencies have to be taken into consideration when controlling the position of the reverse bending unit. Coupling the bending and reverse bending processes can have negative effects on the quality of the work pieces and in addition requires great expense on the machine and the control side.

The object of the invention is to prepare a bending device for bending plastically deformable strip material with which the work pieces can be produced to the highest quality and which is nevertheless simply constructed and simple to control.

SUMMARY

This object is achieved under the invention by a bending device for bending plastically deformable strip material, having an advance unit, a guide unit, a bending unit with a reverse bending unit, where the relative position of the reverse bending unit to the bending unit is adjustable and where the reverse bending unit is mounted moveably on the bending unit.

As a result of the inventive positioning of the reverse bending unit on the bending unit, it is possible to keep the reverse bending, or the reverse bending torque, respectively, constant when the bend is changed during the bending process with little expense for control equipment, since the reverse bending unit also performs the adjusting movements for the bending unit. If the reverse bend is to be changed during the bending process, it is only necessary to move the reverse bending unit relative to the bending unit, so that compared with the known bending unit a decoupled, simpler and more precise control of the reverse bending unit is achieved.

In one version of the bending unit under the invention, provision is made for the bending unit to have a bending roller and for the reverse bending unit to be rotatable about the axis of rotation of the bending roller, so that the reverse bending unit is mounted to the bending unit with a simple, economical and accurate pivot bearing.

To improve the invention the bending unit can be moved slidingly relative to the guide unit, so that different bending radii are possible.

In one aspect of the invention the position of the bending unit is controlled relative to the guide unit, specifically numerically controlled, so that a change in the bending radius is possible during the bending process.

In another aspect of the invention the rotation of the reverse bending unit around the axis of rotation of the bending roller is controlled, specifically numerically controlled, so that the reverse bend can also be changed during the bending process.

In an improvement of the invention, the reverse bending unit has a crank on which a reverse bending roller is located, resulting in simple construction of the inventive bending device, capable of sustaining a high mechanical load.

In a further improvement of the invention, the distance of the reverse bending roller to the axis of rotation of the bending roller is adjustable so that a further degree of freedom is attained in shaping of the reverse bending process.

In other aspects of the invention provision is made for an actuator to rotate the reverse bending unit at least indirectly, specifically for a pneumatic cylinder, a hydraulic cylinder, a linear motor or a servo motor, to be provided so that the reverse bending unit can be rotated depending on the required accuracy of positioning.

In one aspect of the invention a pinion is furnished on the reverse bending unit, whose center lies in the axis of rotation of the bending roller and the actuator drives a rack interacting with the pinion so that, independently of the rotational position of the reverse bending unit, the force of the actuator is proportional to the torque exerted by the reverse bending on the strip material. A constant reverse bending torque can thereby be set in a very simple way.

In another aspect of the invention the actuator is articulated at a point outside the rotational axis of the bending roller on the reverse bending unit so that control of the reverse bending unit is simple and economical.

Another aspect envisions that a servo drive is provided as the actuator.

In one aspect of the invention the guide unit has several guide rollers positioned on both sides of the strip materials so that aligning and guiding the strip material involves low-friction and is economical and operationally safe.

As an improvement to the invention provision is made for the advance unit to have at least two advance rollers positioned on opposite sides of the strip material and for at least one advance roller to be driven by a motor, so that the strip material can be transported through the bending unit in a simple way. The drive for the advance unit can be numerically controlled.

In a further improvement to the invention, provision is made for a cutting unit, also numerically controlled, so that after a workpiece is completed it can be separated from the strip material.

In a further improvement of the invention, a reader is furnished which sends signals to the bending device controls depending on markings on the strip material so that no serial failures occur in the production of work pieces from the strip material.

BRIEF DESCRIPTION OF THE DRAWING

Other advantages and advantageous embodiments of the invention can be found in the following description, the drawing and the claims.

One aspect of the subject of the invention is shown schematically in FIG. 1.

DETAILED DESCRIPTION

A schematic rendering of the bending device 1 under the invention is shown in FIG. 1. It consists of an advance unit 3, a reader 5, a bending unit 9 and a reverse bending unit 11.

The advance unit 3 consists of two advance rollers 13 between which strip material 15 runs, which is coiled on a supply spool 17. The advance rollers 13 are driven and exert a contact pressure on the strip material 15 so that the advance pressure is transferred frictionally from the advance rollers 13 to the strip material 15. Not shown in FIG. 1 is a numerical control for the bending device 1 which also controls the advance unit 3. Also not shown are trigger markings on the strip material 15 which mark the beginning and/or end of a workpiece. Also not shown in FIG. 1 are possible changes to the width and/or depth of the cross section of the strip material 15, which provide different degrees of bending stiffness.

Viewed in the pass-through direction of the strip material 15, a reader 5 is located behind the advance unit 3, which recognizes the trigger markings on the strip material 15 not shown in the Figure and transmits corresponding signals to the controls for the bending device 1. By triggering the controls with the strip material 15, serial failures are avoided and thus the precision of the finished bent part is enhanced.

A guide unit 7 is attached in sequence to the reader 5, consisting of several rotatably mounted guide rollers 19. The guide rollers 19 are positioned on both sides of the strip material 15 and ensure that the strip material 15 enters the bending unit 9 in a specific direction and that torque occurring during bending is dissipated.

The bending unit 9 has a bending roller 21 with a rotational axis 23. The bending roller 21 is positioned on a carriage 25, which in turn can be moved slidably in the direction of the double-ended arrow 27. The bending radius of the strip material 15 is determined by sliding the carriage 25. The carriage 25 is moved by a positioning cylinder 29. Naturally, gear motors with jack screws, linear motors or similar are suitable for effecting the movement of the carriage 25. The positioning cylinder 29 is controlled by the controls for the bending device 1.

The reverse bending unit 11 has a rotatably mounted crank 31, where the rotational axis of the crank 31 and the rotational axis of the bending roller 21 coincide. On the crank is a reverse bending roller 33 whose rotational axis runs parallel to the rotational axis 23 of the bending roller 21. The reverse bending roller 33 is attached moveably in an elongated hole 35 on the crank 31 so that the distance between reverse bending roller 33 and the bending roller 21 is adjustable. This results in an additional degree of freedom in the shaping of the reverse bend.

A contact point 37 between reverse bending roller 33 and strip material 15 lies on the other side of the strip material 15 as does a contact point 39 between bending roller 21 and strip material 15.

Concentric to the rotational axis 23, a pinion 41 is secured against rotation on the crank 31, which a rack 43 engages which can be slid by an actuator 45 in the direction of the double-ended arrow 47. The actuator 45 is also controlled by the controls for the bending device 1, which are not shown. An adjusting motion of the actuator 45 effects a rotational motion of the crank 31 about the axis of rotation 23. Any desired reverse bending torque can thus be set by rotating the crank 31.

The advantage of this aspect is that, assuming constant pressure, or constant adjusting force, respectively, from the actuator 45, the reverse bending torque that is transmitted by the reverse bending roller 33 to the strip material 15 is independent of the position of the carriage 25 or of the bending torque which the bending roller 21 exerts on the strip material 15. Bending and reverse bending are thereby completely decoupled from each other, which improves the precision of the shape of the bent work pieces on the one hand and on the other simplifies the controls for the bending device under the invention.

In another embodiment which is not shown in FIG. 1, a piston 49 on the actuator 45 is articulated directly to the crank 31 so that a particularly simple and economical rotation of the crank 31 is possible. In this embodiment an additional non-linear connection exists between the position of the actuator and the torque transmitted by the reverse bending roller 33 to the strip material 15. Since this non-linear connection is positive, the reverse bending torque can be adjusted precisely through the controls for the actuator 45.

Also not shown in FIG. 1 is a cutting unit with which a completely processed work piece is separated from the strip material 15, whereupon production of the next workpiece can begin.

The bending unit under the invention is particularly suitable for bending the backbones of flat-blade windshield wipers, embodiments whereof are described in U.S. Pat. No. 3,192,551.

All the features shown in the description, the subsequent claims and the drawing can be fundamental to the invention both individually as well as in any combination with each other.

What is claimed is:

1. A bending device for bending plastically deformable strip material having an advance unit, a guide unit, a bending unit for bending the strip in one direction, and a reverse bending unit for bending the strip in an opposite direction, where the relative position of the reverse bending unit to the bending unit is adjustable, characterized in that the reverse bending unit is arranged moveably on the bending unit, and where the bending unit and the reverse bending unit are moveable as a single unit relative to the guide unit.

2. The bending device from claim 1, wherein the bending unit has a bending roller and the reverse bending unit can be rotated about the rotational axis of the bending roller.

3. The bending device of claim 1, wherein the bending unit can be slid relative to the guide unit.

4. The bending device of claim 3, wherein the position of the bending unit is controlled relative to the guide unit.

5. The bending device of claim 2, wherein the rotation of the reverse bending unit about the rotational axis of the bending roller is controlled.

6. The bending device of claim 1, wherein the reverse bending unit has a crank, and wherein a reverse bending roller is arranged on the crank.

7. The bending device of claim 1, wherein an actuator arranged on the bending unit is provided, rotating the reverse bending unit at least indirectly.

8. The bending device of claim 7, wherein the actuator is one of a pneumatic cylinder, a hydraulic cylinder and a linear motor.

9. The bending device of claim 8, wherein a pinion is furnished on the reverse bending unit, the center of the pinion lies in the rotational axis of the bending roller, and the actuator drives a rack interacting with the pinion.

10. The bending device of claim 8, wherein the actuator is articulated at a point outside the rotational axis of the bending roller on the reverse bending unit.

11. The bending device of claim 7, wherein the actuator is a servo drive.

12. A bending device for bending plastically deformable strip material having an advance unit, a guide unit, a bending unit comprising a bending roller for bending the strip in one direction, and a reverse bending unit for bending the strip in an opposite direction, where the relative position of the reverse bending unit to the bending unit is adjustable, characterized in that the reverse bending unit is arranged moveably on the bending unit, and wherein the reverse bending unit has a crank and a reverse bending roller arranged on the crank such that the distance of the reverse bending roller to the rotational axis of the bending roller is adjustable.

13. A bending device for bending plastically deformable strip material comprising:
a set of guide rollers for directing the plastically deformable strip material along a path of movement;
a frame moveable transversely with respect to the path of movement of the plastically deformable strip material;
a bending roller for bending the strip in one direction and having an axis of rotation supported by the frame for adjusting a position of the bending roller with respect to the plastically deformable strip material; and
a reverse bending roller for bending the strip in an opposite direction and having an axis of rotation associated with the frame for adjustably positioning the reverse bending roller relative to the bending roller in a desired orientation, wherein movement of the frame relative to the path of movement of the plastically deformable material causes concurrent movement of the axis of rotation of the bending roller and the axis of rotation of the reverse bending roller while maintaining the desired orientation of the bending roller relative to the reverse bending roller.

14. The bending device of claim 13, wherein positioning of the axis of rotation of the bending roller is fixed relative to the frame.

15. The bending device of claim 13, wherein the axis of rotation of the reverse bending roller is positionable in different angular and radial positions with respect to the axis of rotation of the bending roller.

16. The bending device of claim 13, wherein a distance between the bending roller and the reverse bending roller is adjustable.

17. The bending device of claim 13 further comprising a crank member having one end pivotally associated with the frame and another end supporting the axis of rotation of the reverse bending roller, wherein a pivot axis of the crank is positioned substantially to coincide with the axis of rotation of the bending roller.

18. The bending device of claim 17 further comprising an actuator arranged on the frame for concurrent movement therewith, the actuator engageable with the crank member for pivoting the axis of rotation of the reverse bending roller relative to the axis of rotation of the bending roller.

19. The bending device of claim 18 further comprising a pinion attached to the crank member, the pinion having an axis of rotation positioned to substantially coincide with the axis of rotation of the bending roller, and a rack meshedly engageable with the pinion, the rack being operably driven by the actuator.

20. The bending device of claim 13 further comprising:
a crank member having one end pivotally associated with the frame and another end supporting the axis of rotation of the reverse bending roller, a pivot axis of the crank positioned substantially to coincide with the axis of rotation of the bending roller;
an actuator arranged on the frame for concurrent movement therewith, the actuator engageable with the crank member for angularly positioning the axis of rotation of the reverse bending roller relative to the axis of rotation of the bending roller;
a pinion attached to the crank member, the pinion having an axis of rotation positioned to substantially coincide with the axis of rotation of the bending roller; and
a rack meshedly engageable with the pinion, the rack being operably driven by the actuator, the axis of rotation of the bending roller being fixed relative to the frame and the axis of rotation of the reverse bending roller is positionable in different angular and radial positions with respect to the axis of rotation of the bending roller in response to movement of the rack by the actuator with respect to the pinion.

* * * * *